UNITED STATES PATENT OFFICE.

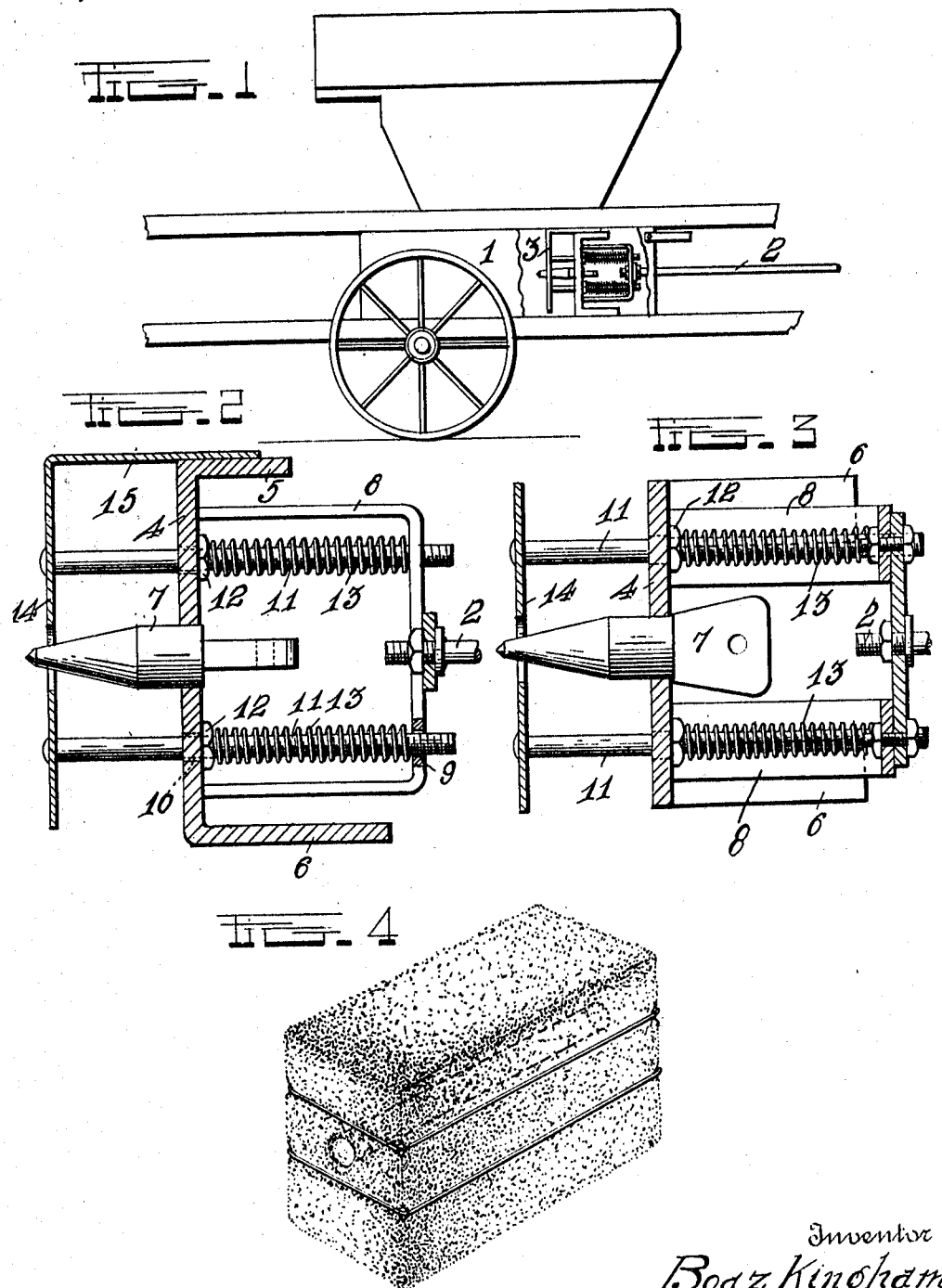

BOAZ KINGHAM, OF TECUMSEH, OKLAHOMA.

ATTACHMENT FOR HAY-PRESSES.

970,930.

Specification of Letters Patent. Patented Sept. 20, 1910.

Application filed January 31, 1910. Serial No. 541,071.

*To all whom it may concern:*

Be it known that I, BOAZ KINGHAM, a citizen of the United States, residing at R. R. No. 4, Tecumseh, in the county of Pottawatomie and State of Oklahoma, have invented certain new and useful Improvements in Attachments for Hay-Presses; and I do declare the following to be a full, clear, and exact description of the invention, such as will enable others skilled in the art to which it appertains to make and use the same.

This invention relates to improvements in attachments for hay presses.

The object of the invention is to provide an improved construction of plunger for hay baling presses having means whereby a hole will be formed through the bale, thus providing for the proper curing of any hay which may not have been thoroughly dried when baled.

With the foregoing and other objects in view, the invention consists of certain novel features of construction, combination and arrangement of parts as will be more fully described and particularly pointed out in the appended claims.

In the accompanying drawings, Figure 1 is a side view of a portion of a hay press showing the application of the invention, parts being broken away and in section; Fig. 2 is a central vertical sectional view of the plunger on an enlarged scale; Fig. 3 is a central horizontal sectional view of the same; Fig. 4 is a perspective view of a bale of hay showing the hole formed therethrough by the attachment.

Referring more particularly to the drawing, 1 denotes the baling chamber of a hay press, 2 denotes the plunger operating rod, the end of which has secured thereon a plunger head 3 which is slidably mounted in the baling chamber. The plunger rod 2 is connected with any suitable operating mechanism (not shown).

The plunger head 3 may be of any suitable construction but is here shown and preferably consists of a plate 4 having on its upper end a right angularly bent flange 5 and on its lower end right angularly bent guide fingers 6. In the center of the plate 4 is secured a core pin 7 having a tapered or conical-shaped forward end, said core pin being adapted to be forced through the hay while being pressed in the baling chamber by the plunger head, thereby forming a hole or passage through the bale to permit the free circulation of air through the latter, whereby the hay will be dried and cured after being baled. The outer end of the pin projects beyond the rear or outer side of the plate 4 and said projecting end of the pin is preferably provided with a flattened head, as shown.

Secured to the rear or outer side of the plate 4 are rectangular guide frames 8, in the vertical portions of which are formed guide passages 9, which aline with similar passages 10 formed in the plate 4 adjacent to its opposite side edges. With the passages 9 and 10 are slidably engaged guide rods 11 on which, adjacent to the rear side of the plate 4, are arranged stop nuts 12. On the rods 11 between the nuts 12 and the vertical portions of the guide frames 8 are arranged spiral springs 13, the pressure of which is exerted to project the ends of the rods 11 beyond the outer face of the plate 4, as shown. To the outer ends of the rods 11 is rigidly secured a guard plate 14, on the upper edge of which is formed a rearwardly projecting guard flange 15, which is slidably engaged with the flange 5 on the upper edge of the plate 4. In the center of the guard plate is formed a circular aperture through which the core pin 7 is adapted to project when the guard plate 14 is forced back by pressure against the hay when the plunger is projected.

When the plunger is retracted, the springs 13 again force the guard plate outwardly over the core pin, thus permitting the latter to retract and holding the hay back. The flange 15 on the upper edge of the guard plate prevents the hay from being forced in between the guard plate and the plunger plate 4. The guard plate and flange also prevent the hay from catching on to the end of the core pin.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim is:—

1. In a hay press, a baling plunger comprising a plunger rod, a plunger head secured to said rod, a core pin arranged in said plunger head to form a passage through the bale of hay formed in the press, and means to prevent the hay from catching on said core pin during the process of feeding the hay to the bales.

2. In a baling press, a plunger comprising a plunger rod, a plunger head secured thereto, a core pin secured to said head and adapted to be projected thereby through the charges of hay when forced into the press thereby providing a ventilating passage through the bale, a guard plate yieldingly connected to said plunger head and adapted to prevent the hay from catching on and interfering with the operation of the plunger head and core pin.

3. In a hay baling press, a plunger comprising a plunger rod, a plunger head secured to the end of said rod, said head comprising a plate having on its upper edge a right angularly rearwardly projecting flange and on its lower edge right angularly projecting guide fingers, a core forming pin secured to said plunger plate, guide frames secured to the rear or outer side of said plunger plate, guide rods slidably engaged with said plate and frames, springs arranged on said rods to normally project and to hold the same in projected position, a guard plate secured to the outer ends of said rods, said plate having formed therein a central passage to receive said core forming pin, and a guard flange formed on the upper edge of said plate and adapted to engage the flange on said plunger plate whereby hay is prevented from entering between said guard and plunger plates.

In testimony whereof I have hereunto set my hand in presence of two subscribing witnesses.

BOAZ KINGHAM.

Witnesses:
E. J. DICKERSON,
ROBERT A. HUBBARD.